(12) United States Patent
Le Pennec et al.

(10) Patent No.: US 6,961,337 B2
(45) Date of Patent: Nov. 1, 2005

(54) INTERLEAVED PROCESSING SYSTEM FOR PROCESSING FRAMES WITHIN A NETWORK ROUTER

(75) Inventors: Jean Francois Le Pennec, Nice (FR); Claude Pin, Nice (FR); Alain Benayoun, Cagnes sur Mer (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 09/753,921

(22) Filed: Jan. 3, 2001

(65) Prior Publication Data

US 2001/0007559 A1 Jul. 12, 2001

(30) Foreign Application Priority Data

Jan. 6, 2000 (EP) ............................................. 00480005

(51) Int. Cl.⁷ ............................................. H04L 12/28
(52) U.S. Cl. ............................. 370/392; 707/3; 709/238
(58) Field of Search ................................. 370/392, 401, 370/389, 395.31, 395.32; 707/3; 709/238; 711/211

(56) References Cited

U.S. PATENT DOCUMENTS 5,917,821 A * 6/1999 Gobuyan et al. ........... 370/392
6,026,473 A * 2/2000 Cross et al. ................ 711/157

* cited by examiner

Primary Examiner—Ajit Patel
Assistant Examiner—Andrew C. Lee
(74) Attorney, Agent, or Firm—John R. Pivnichny; Dillon & Yudell LLP

(57) ABSTRACT

A system and method for performing interleaved packet processing. A packet includes a source address bit pattern and a destination address bit pattern that are processed by a task processor in accordance with a data tree. A first bank of registers is utilized to load an instruction to be executed by the task processor at nodes of the data tree in accordance with the source address bit pattern. A second bank of registers is utilized for loading an instruction to be executed by the task processor at nodes of the data tree in accordance with the destination address bit pattern. A task scheduler enables the first bank of registers to transfer an instruction loaded therein for processing by the task processor only during even time cycles and for enabling the second bank of registers to transfer an instruction loaded therein for processing by the task processor only during odd time cycles.

16 Claims, 5 Drawing Sheets

INTERLEAVED PROCESSING SYSTEM FOR PROCESSING FRAMES WITHIN A NETWORK ROUTER

BACKGROUND OF THE INVENTION

1. Technical Field

The present invention relates generally to systems for processing routing and filtering information for each packet received at a router node of a data transmission network, and in particular to an interleaved processing system based upon a tree lookup structure in a network router.

2. Description of the Related Art

Today, data communication systems are based upon data transmission networks wherein routers are used to link remote sites. Routing is a major bottleneck in such systems primarily due to the overhead processing time and the additional memory capacity required for routing. One of the primary routing functions entails determining a particular routing path for a packet or frame across the network using specific protocols. This path determination is based on a variety of metrics such as the delay introduced by the network or the link cost. In addition, this determination takes into account other rules generically called filtering, such as communication restrictions or priority criteria.

Another important routing function is packet forwarding which entails processing of inbound data packets and the subsequent forwarding of these data packets to the appropriate outbound destination in accordance with a destination address within the packet header.

Both the determination of the routing path and packet forwarding based upon the destination address field in the packet header, are performed within the same routing device. Nevertheless, new techniques tend to exploit the difference between these functions, thus separating the corresponding operations. For example, a single routing path processing unit could support several packet forwarding units.

Since the routing processing time is relatively high and varies from one routing computation to another, it is difficult to support multiple time sensitive applications such as multimedia. For both the filtering and packet forwarding processing, memory searches consume considerable time. Within the routing processing context, "searching" entails retrieving routing information encoded within a predetermined bit pattern of an packet address header. In particular, the destination of a data packet typically corresponds to such a bit pattern within the destination address field of the packet header. The required search involves comparing a portion of the destination address bit pattern to a predetermined bits sequence, or "keys", that identify appropriate routing information. Efforts have been made to optimize the speed of such comparison based searches (often referred to as prefix matching searches) by using parallel processing, but this method admits its own limitations.

In addition to packet forwarding, a typical packet routing cycle includes a filtering process that is performed with respect to a source address field in the packet header. Today, the routing process and the filtering process are either performed sequentially utilizing a single processing entity, or are performed simultaneously utilizing two separate processing units. For each process, there are two phases which are repeated until the end of the process. These processes are typically referred to as an instruction loading phase and an instruction processing phase. It should be noted that, in classical systems, the loading and processing phases are very close in duration.

The routing function for determining an outgoing destination node to which a packet will be forwarded, typically utilizes a longest prefix matching (LPM) algorithm that is generally implemented in a tree structure. The filtering process may also utilize this same type of process and algorithm but in a separate tree structure. The trees utilized for routing and filtering are implemented in a memory structure containing an instruction at each tree node, wherein each instruction provides a link to sub-nodes. The tree structure is thus traversed starting from a tree root down to a leaf node that contains an instruction which provides either the routing information or the filtering rules. This last instruction is very often provided in an indirect manner such as by an address value that corresponds to the field that contains the routing, or by filtering information for each leaf node. For further information regarding the nature of LPM searching, reference is made to the article "Routing on longest-matching prefixes", IEEE/ACM transactions on networking, vol. 4, n_1, February 1996, pages 86–97 which is incorporated herein by reference.

Systems currently available for processing the routing function or the filtering function using a tree structure require considerable memory overhead for storing the information in each node, and also consume considerable processing overhead for the requisite large number of memory accesses. From the foregoing, it can be appreciated that a need exists for a processing system that enables an optimized the processing system and method for performing both routing and filtering functions within a router.

SUMMARY OF THE INVENTION

A system and method for performing interleaved packet processing in a network router are disclosed herein. A packet to be routed includes a source address bit pattern and a destination address bit pattern that are each processed by a task processor in accordance with a data tree. The data tree includes multiple nodes linked by branches wherein an instruction that is associated with each node within the data tree is utilized for determining which branch is to be taken in accordance with the source address bit pattern or the destination address bit pattern. A first bank of registers is utilized to load an instruction to be executed by said task processor at each node of the data tree in accordance with the source address bit pattern. A second bank of registers is utilized for loading an instruction to be executed by the task processor at each node of the data tree in accordance with the destination address bit pattern. A task scheduler enables the first bank of registers to transfer an instruction loaded therein for processing by the task processor only during even time cycles and for enabling the second bank of registers to transfer an instruction loaded therein for processing by the task processor only during odd time cycles.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
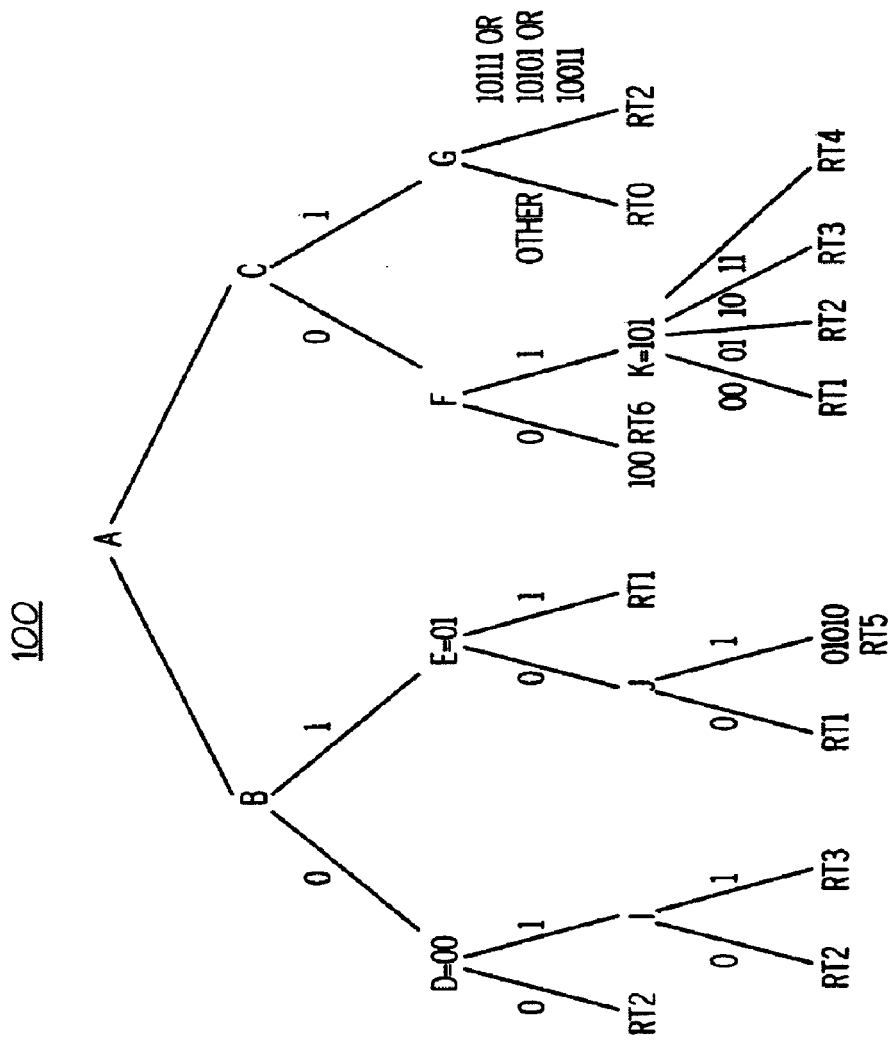
FIG. 1 illustrates a tree structure utilized with the interleaved packet processing performed in accordance with a preferred embodiment of the present invention.

With reference now to the figures wherein like reference numerals refer to like and corresponding parts throughout, and in particular with reference to FIG. 1, there is illustrated a tree structure utilized with the interleaved packet processing performed in accordance with a preferred embodiment of the present invention. As depicted in FIG. 1, a top level A of a tree 100, is commonly referred to as the "root" node. Intermediate nodes, referred to alternately as "branches", are represented by letters B to K. End nodes ("leafs") represent a corresponding instruction for a packet such as the route for the packet to follow such as RT0 to RT5. For the case in which tree 100 is a routing tree for performing destination address searching, the result of a leaf instruction may be to accept a routing instruction for the packet. If tree 100 is a filter check tree, the result of the tree instruction search may be to determine relevant network routing parameters such as the priority of the packet. Additional filtering decision may be performed utilizing a higher level protocol type.

The left part of tree 100 starting from A and proceeding to node B, etc. represents a classical binary tree search in which one bit position per unit time is analyzed. As illustrated on the left part of tree 100, the left branch is selected and traversed when the result of the instruction contained in each branch node is a binary 0 and the right branch is selected when the instruction yields a binary 1.

The right side of tree 100 starting from A and proceeding to node C, etc. represents a tree search including some binary elements and other more complex elements. For example, node K includes four branches that are selectable based on a two-bit analysis, and node G having two branches that are selectable based on a five-bit analysis.

For the embodiments depicted by the figures herein, it is assumed that multiple 16-bit instruction words are associated with each node for routing or filtering processing. The selection of a 16-bit instruction is based on the current state of the art in which 16-bit instruction words are common. It should be noted, however, that for complex decision methods or for cases in which more than two branches are involved, instructions can have different lengths without departing from the spirit or scope of the present invention.

Figure 2:
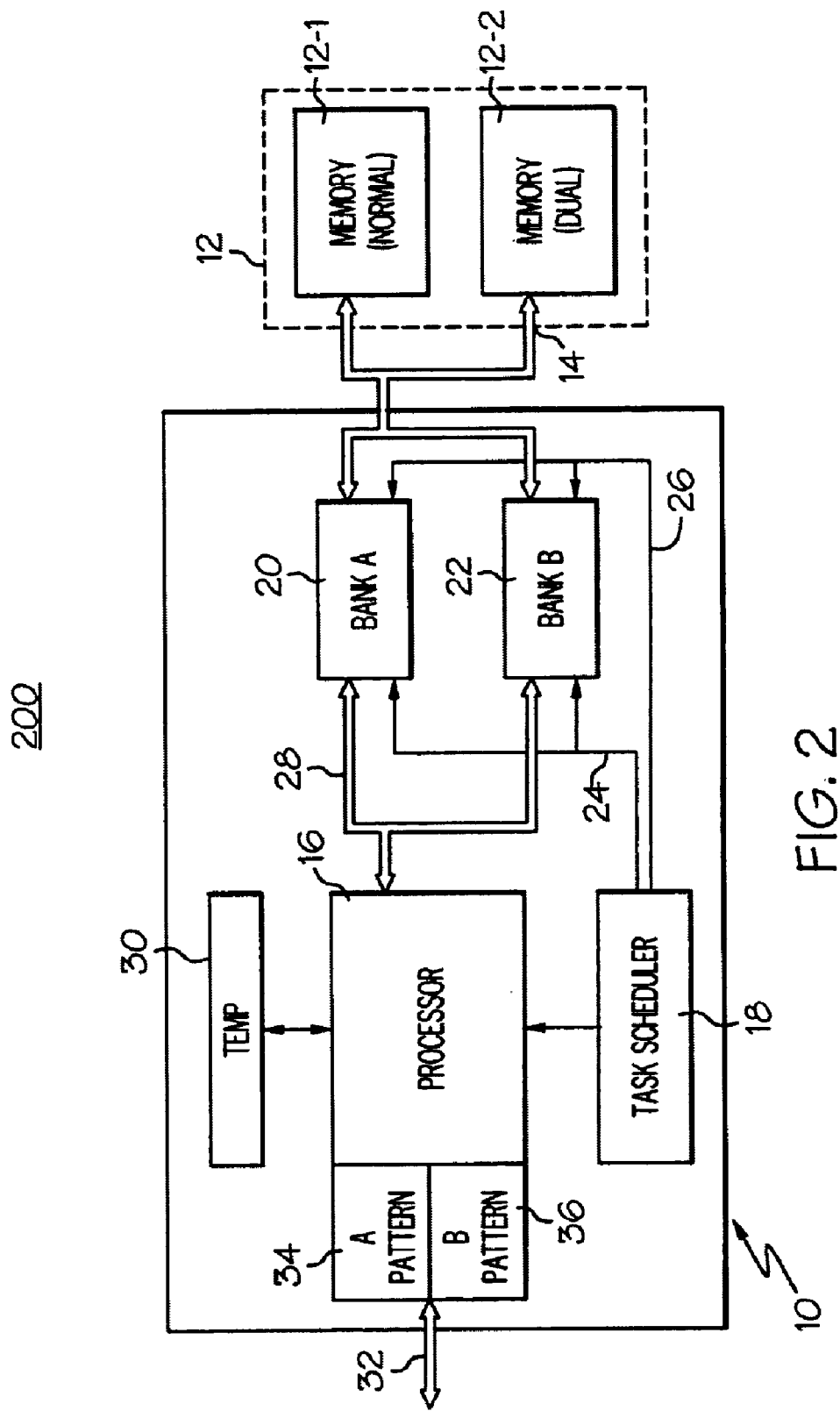
FIG. 2 is a block diagram depicting an interleaved packet processing system in accordance with a preferred embodiment of the present invention.

With reference now to FIG. 2, there is illustrated a block diagram depicting an interleaved packet processing system in accordance with a preferred embodiment of the present invention. Specifically, an interleaved packet processing system 200 includes a bi-task processing engine 10 connected to an external memory 12 by a standard address bus, data bus and control bus represented schematically by a bus 14. External memory 12 stores instructions that are executed at each node of the tree and is divided into two sub-memories 12-1 and 12-2. Sub-memory 12-1 contains normal size (16-bit) instructions that are executed only in response to particular predefined values on most significant bit (MSB) of a binary address sequence, while area 12-2 contains dual (double) size instructions. In accordance with a preferred embodiment of the present invention, external memory 12 contains the instructions of two independent trees.

As further depicted in FIG. 2, processing engine 10 includes a main task processor 16 that can be either a finite state machine or a nano-processor and a task scheduler 18 that generates "thread" clocking composed of successive alternate even and odd time cycles and enables processing activity and loading for each task. Task scheduler 18 is connected to task processor 16 to initiate a node process. Task scheduler 18 is also connected to registers banks, bank A 20 and bank B 22 via activation lines 24 and 26.

Bank A 20 and Bank B 22 contain respectively the instructions associated with each node in a given tree. Activation signal carried from task scheduler 18 on activation lines 24 and 26 are utilized for loading an instruction from external memory 12 to one of banks 20 or 22 via external bus 14. Activation signals on activation lines 24 and 26 also activate the transfer of an instruction from the other bank (the bank not being loaded from external memory 12) to task processor 16 via an internal bus 28 for processing the instruction. At any given time, a bank has only one of the above access valid signals carried on bus 28 while the other bank has access to bus 14. This bus connection is inverted at each edge of the thread clock allowing the process of an instruction on one tree while an instruction of the other tree is loaded into its corresponding bank. In a preferred embodiment of the present invention, one of Bank A 20 or Bank B 22 is associated with a source address tree while the other bank is associated with a destination address tree in an address lookup mechanism.

Multiple temporary registers 30 within processing engine 10 contain information for each task that is maintained between two consecutive processing periods of processor 16. Temporary registers 30 are particularly useful when the processing of an instruction is split into two times cycles of the clock within task scheduler 18. The address bit patterns that are processed by instructions loaded into processor 16 are provided by a system bus 32 into a pattern register A 34 and a pattern register B 36.

Figure 3:
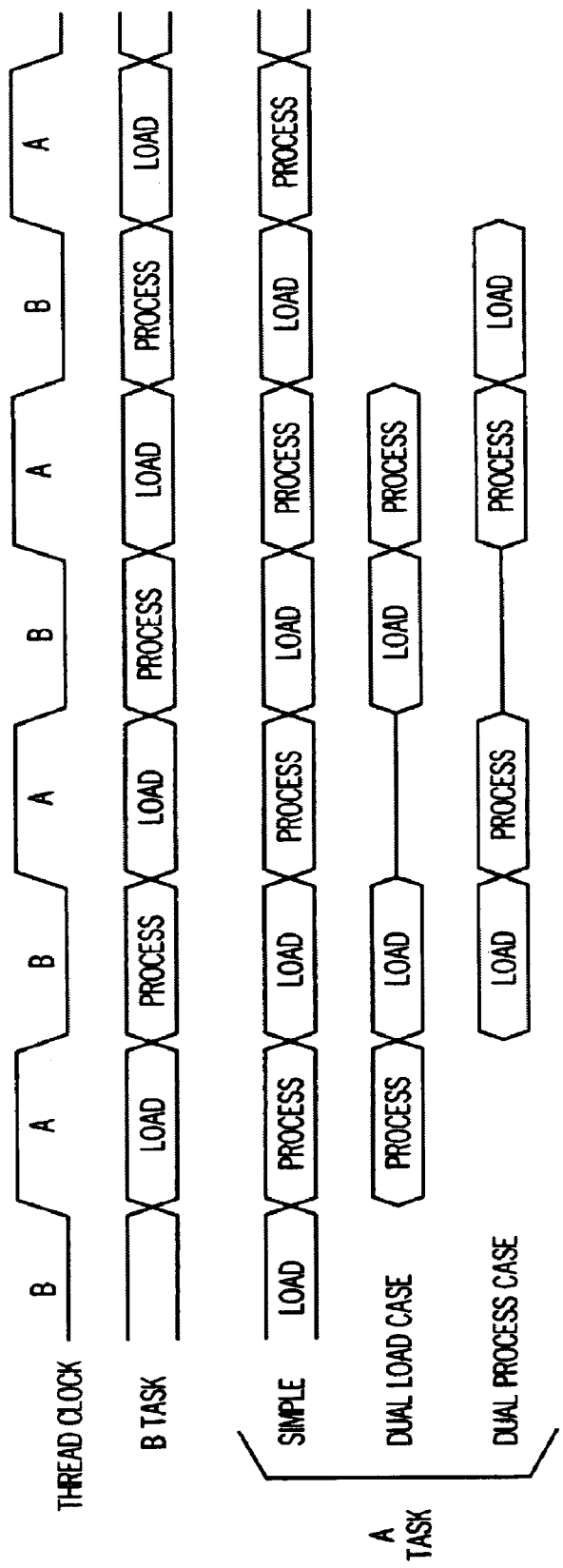
FIG. 3 is a timing diagram illustrating interleaved tasks performed by a task processor in accordance with a preferred embodiment of the present invention.

Turning now to FIG. 3, there is illustrated a timing diagram depicting the interleaving of tasks performed by task processor 16 as per the direction of task scheduler 18 in accordance with a preferred embodiment of the present invention. As shown in FIG. 3, the thread clock maintained by task scheduler 18 has a rising edge when process A is activated and a falling edge when the process B starts. The instruction structure encompassed by processing engine 10 is designed to operating in temporal increments corresponding exactly to the duration of each clock cycle which is constant so that there is no need to check whether process A is completed or not, and similarly for process B.

While task A is processed, a next instruction for task B is loaded into register bank B. Similarly, while task B is being processed, a next instruction for task A is loaded into bank A. The result is a continual interleaving process in which task A and task B until each process reaches a leaf node.

If there is a need to process a longer instruction (stored in the second memory area 12-2) that cannot fit within a single cycle, temp register 30 within processing engine 10 enables utilization of two cycles for processing such an instruction. FIG. 3 depicts a dual loading of a long instruction during task A. As shown in FIG. 3, processing for task A is delayed until the full loading is completed over two task A loading cycles that are interleaved with process cycles as per the scheduling provided by task scheduler 18. It is also possible to start part of the process and to set A or B state bit (illustrated in FIG. 4) when the cycle ends and before the end of the cycle, to store intermediate state or results into the temp register 30 dedicated to the corresponding task.

The dual processing of an instruction for task A is also depicted in FIG. 3 for the case in which a single size instruction halts the loading during one thread until the instruction is fully processed. This mechanism requires the use of temp register 30, as task processor 18 will process task B in between processing intervals for the processing of task A.

Figure 4:
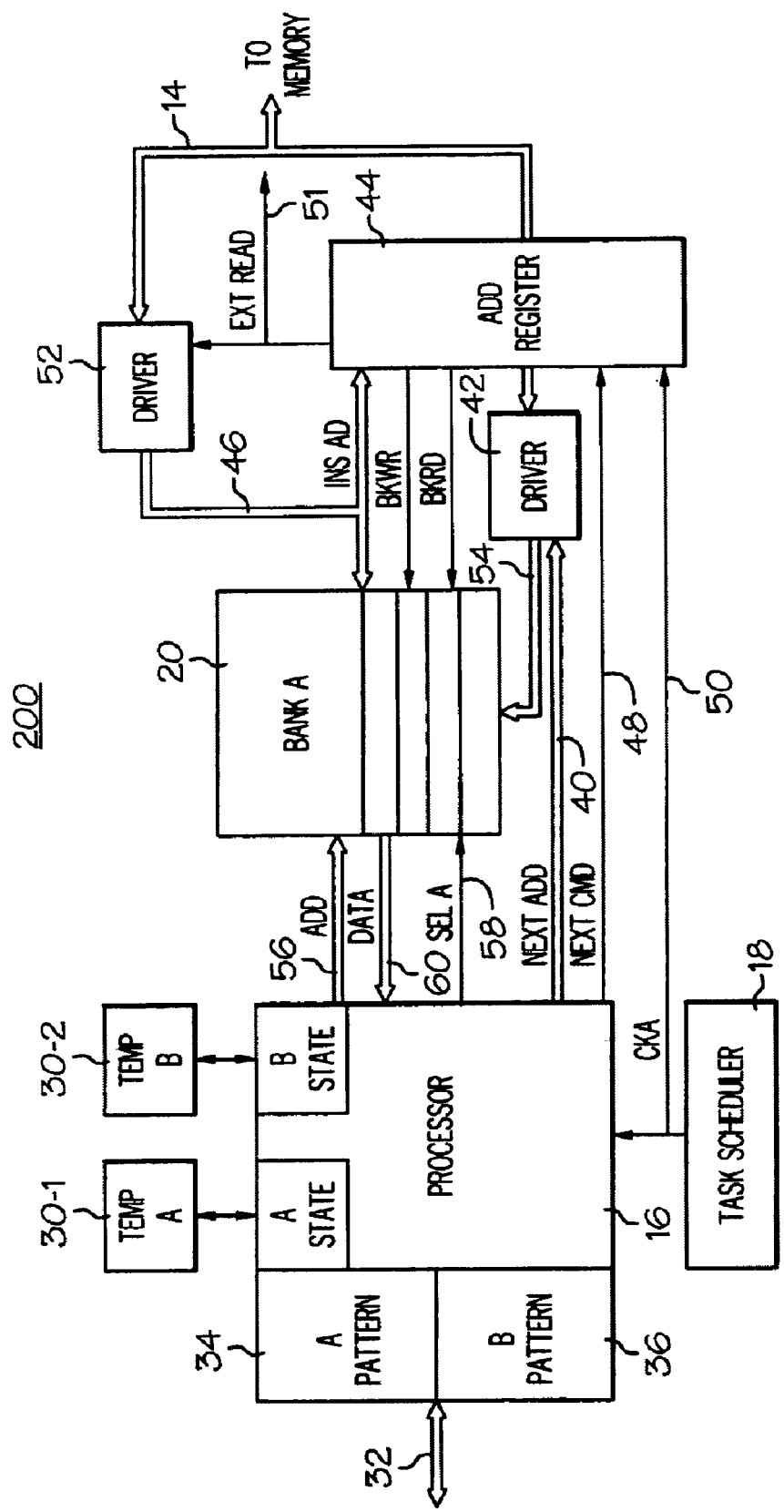
FIG. 4 is a detailed block diagram depicting an interleaved packet processing system in accordance with a preferred embodiment of the present invention.

With reference now to FIG. 4, there is illustrated a detailed block diagram depicting interleaved packet processing system 200 in accordance with a preferred embodiment of the present invention. At the beginning of a packet address processing interval, bank A 20 is loaded by a bit pattern that provides as a next instruction, the root address for tree A. The stored address for the next instruction (the root address in the first step but contained in the instruction for further steps) is provided by task processor 16 via NEXT ADD bus 40 and driver 42 to bank A.

The address contents are loaded into an ADD (address) register 44 via bank data bus 46 as "InsAD" (Instruction Address) in response to a BKRD Bank read command activated by a NEXTCMD signal from task processor 16 on line 48. The NXTCMD signal instructs ADD register 44 to load this next address for instruction. NEXTCMD includes the index (IX) (described in FIG. 5) used to increment the next address for instruction. ADD register 44 is a register/counter loaded by "InsAD" which is the address of the first word of the instruction to be loaded and whose value is incremented by an integrated counter (not depicted) to load the other words of the instruction.

When a rising edge is detected on CKA line 50 from task scheduler 18, the first address corresponding to the initial state of the counter is presented on external add bus 14 with a ext read command on line 51 in order to access the external memory. A driver 52 is activated by Ext read command on line 51 and a driver 42 is also opened to present the least significant bits (LSBs) of the address to load the memory field into the corresponding register of bank A 20 with a bank write command BKWR. As the first address indicates whether the instruction is a single instruction (located in area 12-1) or a dual instruction (located in area 12-2), it is possible to stop the counter at the end of the cycle on the last word that should be downloaded.

In case of a dual size instruction, a bit DUAL is set within ADD register 44 which prevents task scheduler 18 through CKA line 50 from reloading the address from bank A to ADD register 44 thus allowing the counter to continue to load the remaining words of the instruction into bank A during the next cycle. The size of bank A is designed to accept a dual size instruction. For each word loaded from memory in response to a read signal and a chip select signal, ADD register 44 selects the appropriate register in bank A by using the LSB bits of the counter value on bank add bus 54 as the register address to load the instruction word in the appropriate bank register in response to a bank write (BKWR) to this location. Upon occurrence of the next CKA rising edge, the DUAL bit is tested. If the DUAL bit is set, the counter continues and loads the additional instruction words until the counter reaches its limit. If the DUAL bit is not set, ADD register 44 loads a BKWR Read command into the register of bank A selected by NEXT ADD on bus 40 from task processor 16. The loaded BKWR Read command allows the InsAd Instruction Address to be delivered on bank data bus 46 and then stored in ADD register 44.

When the instruction is loaded in bank A 20, task scheduler 18 delivers a CKA signal to inform task processor 16 to fetch the first instruction word in bank A. The first register address is delivered by task processor 16 via add bus 56. A read is then performed on bank A in response to a SEL A command on line 58, and the first instruction word provided from register bank A on data bus 60 is utilized by task processor 16 which can then execute the instruction based on the pattern associated with the loaded instruction to compare it with pattern A in register 34. The result of such a comparison may be to load other instruction words from bank A using the same mechanism. At the end of a processing cycle corresponding to completion of a single clock cycle, either the process is not completed and temporary results are stored in Temp Register 30-1 for task A or the process of the current instruction is finished. Temp register 30-2 is reserved for temporary storage of task B.

In the latter case, when the instruction process is completed, the position (address in bank A) corresponding to the address of the next instruction in bank A is put on next ADD bus 40 using a few bits (3 for eight register positions in bank A) in order to provide the address for the next loading to ADD register 44.

In the former case, in which the instruction process is not completed, two 1-bit A state and B state registers within task processor 16 are each utilized to define the state at the end of the processing cycle that is used when more than one cycle is processed. The setting of the single bit in A state and B state registers indicates whether the next instruction to be processed is a continuation of the previous processing activity or a new instruction.

Figure 5:
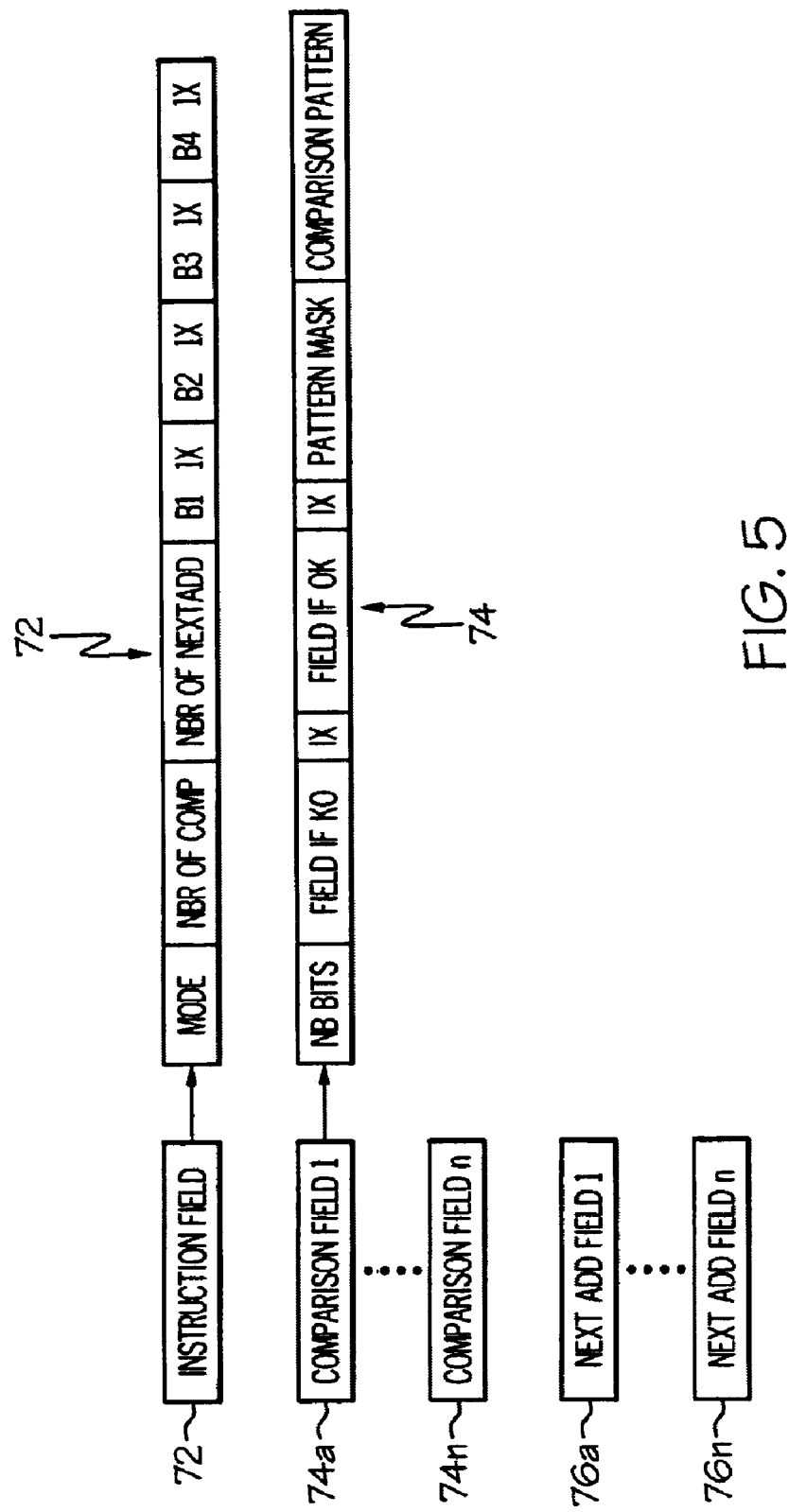
FIG. 5 illustrates a representative format of an lookup instruction utilized in the interleaved packet processing system of the present invention.

Turning now to FIG. 5, there is illustrated a representative format of a lookup instruction utilized in the interleaved packet processing system of the present invention. As shown in FIG. 5, each lookup instruction contains three main fields. The first of these fields is an instruction field 72 that includes the instruction to be executed by the task processor. The second field in a comparison field, represented in the depicted embodiment as one or more of multiple comparison fields 74a–74n, which contains the pattern previously stored within the external memory (in a table, for example) to compare with the A or B pattern that correspond to a source and destination address bit pattern at the current point of the address processing analysis. Finally, the lookup instruction includes a next address field, represented in the depicted embodiment as one or more of multiple next address fields 76a–76n, that contains the addresses for the possible next instructions.

The instruction field 72 is generally defined in a single word. As shown in the depicted embodiment, the contents of the instruction field 72 include a MODE field specifying the mode of analysis to perform such as one bit, two bits or three bits full comparison resulting in two, four, or eight branches, or, whether a multi-bit pattern comparison should be performed using further comparison fields. The contents of instruction field also include a NBR OF COMP field defining the number of elements (bits) within the comparison field, and the number of bits in the next address field that defines the size of the instruction and informs the processor of whether or not an instruction is fully loaded.

In full comparison mode, additional fields 76a–76n are defined that identify the next address to use for each output case that can be a direct value or an indexed value. There is one such sub-field for each possible branch. FIG. 5 illustrates a case having 4 branches corresponding to a two bits full comparison: branches 00 (B1 IX), 01 B2 IX), 10 (B3 IX) and 11 (B4 IX).

The index (IX) for each of the branch sub-fields B1 IX, B2 IX, B3 IX, and B4 IX is a 2-bit field that indicates the actual address value based on the address given as a base address. A value of 00 for IX indicates that the address is the address of the indicated next add field, while 01 instructs to increment by one the indicated next add field. An IX value of 10 instructs to increment by 2, and 11 to increment by 3. A single next add field allows for pointing onto up to 4 different instruction elements in memory thus reducing the size of the instruction itself.

The comparison field stores, in a COMPARISON PATTERN sub-field, the pattern(s) to compare to the bits starting at the current position in the A or B pattern field. For each pattern, a NB BITS sub-field indicates the length of the pattern, a possible mask (PATTERN MASK), the next address sub field (direct or indexed) to use or next comparison to perform depending on whether or not a match is found (FIELD IF K0, FIELD IF 0K). The index method is the same as what is defined in the instruction field. It should be noted that, when the link is performed on another comparison field, the index field (IX) is irrelevant.

The next address field contains the list of addresses of the nodes connected to the branches of the current node. Consecutive addresses may be used but cannot always be used as in case of multiple branches, wherein an addresses may be followed by a single instruction and while others are followed by a dual instruction.

While the invention has been particularly shown and described with reference to a preferred embodiment, it will be understood by those skilled in the art that various changes in form and detail may be made therein without departing from the spirit and scope of the invention.

What is claimed is:

1. A system for processing a packet, wherein said packet includes a source address bit pattern and a destination address bit pattern that are each processed by a task processor in accordance with a data tree, said data tree including a plurality of nodes linked by branches wherein an instruction that is associated with each node is utilized for selecting a next branch in accordance with said source address bit pattern or said destination address bit pattern, said system comprising:

a first bank of registers for loading an instruction to be executed by said task processor at one or more nodes of said data tree in accordance with said source address bit pattern;

a second bank of registers for loading an instruction to be executed by said task processor at one or more nodes of said data tree in accordance with said destination address bit pattern;

instruction load means for loading said first and second bank of registers; and a task scheduler that enables said instruction load means to load a next instruction to said first bank of registers and enables said second bank of registers to transfer an instruction loaded therein for processing by said task processor during a first time cycle domain, wherein said task scheduler further enables said instruction load means to load a next instruction to said second bank of registers and enables said first bank of registers to transfer an instruction loaded therein for processing by said task processor during a second time cycle domain that is interleaved in an alternating manner with said first time cycle domain.

2. The system of claim 1, wherein said task scheduler includes a clock signal generator that generates said interleaved first and second time cycle domains in an alternating series of rising edges and falling edges.

3. The system of claim 1, further comprising an address register for storing an address of a next instruction to be loaded into either said first bank of registers or said second bank of registers from a memory device before being executed by said task processor.

4. The system of claim 3, wherein said address register further comprises a counter for incrementing said address of the next instruction in response to a dual size instruction.

5. The system of claim 3, wherein said memory includes instructions to be executed by said task processor.

6. The system of claim 5, wherein said memory further comprises a first memory area containing single size instructions and a second memory area containing dual size instructions.

7. The system of claim 1, further comprising at least one temporary register for storing information from said task processor between two consecutive processing time cycles when such a processing lasts more than one time cycle.

8. The system of claim 1, further comprising a 1-bit state register for each of said first and second bank of registers, said 1-bit state register being set when said processing lasts more than one time cycle.

9. A method for processing a packet, wherein said packet includes a source address bit pattern and a destination address bit pattern that are each processed by a task processor in accordance with a data tree, said data tree including a plurality of nodes linked by branches wherein an instruction that is associated with each node is utilized for selecting a next branch in accordance with said source address bit pattern or said destination address bit pattern, said method comprising:

(a) loading into a first bank of registers a next instruction to be executed by said task processor at one or more nodes of said data tree in accordance with said source address bit pattern;

(b) transferring an instruction from a second bank of registers to be processed by said task processor;

(c) loading into said second bank of registers a next instruction to be executed by said task processor at one or more nodes of said data tree in accordance with said destination address bit pattern;

(d) transferring an instruction from said first bank of registers to be processed by said task processor; and (e) scheduling steps (a) and (b) to be coincidentally performed during a first time cycle domain and steps (c) and (d) to be coincidentally performed during a second time cycle domain, wherein said second time cycle domain is interleaved in an alternating manner with said first time cycle domain.

10. The method of claim 9, further comprising generating said first and second time cycle domains in an alternating series of rising edges and falling edges.

11. The method of claim 9, further comprising storing an address of a next instruction to be loaded into either said first bank of registers or said second bank of registers from a memory device before being executed by said task processor.

12. The method of claim 11, further comprising:

loading said address of said next instruction from said task processor into said first or second bank of registers;

transferring said address from said bank of registers to said address register;

reading said address from said address register; and fetching said next instruction from said memory in response to said reading step.

13. The method of claim 11, further comprising incrementing said address of the next instruction in response to a dual size instruction.

14. The method of claim 13, further comprising:

loading a dual size instruction into either said first bank of registers or said second bank of registers;

interrupting said loading step during one time cycle if said loading requires two time cycles; and during said time cycle during which said loading is interrupted, loading an instruction into the other of said first or second bank of registers.

15. The method of claim 13, further comprising:

processing a dual size instruction utilizing said task processor;

interrupting said processing step during one time cycle if such a processing requires two time cycles; and during said time cycle during which said processing is interrupted, executing an instruction provided by the other of said first or second bank of registers.

16. The method of claim 9, further comprising storing information from said task processor between two consecutive processing time cycles when such a processing lasts more than one time cycle within at least one temporary register.

* * * * *